US010306829B2

(12) United States Patent
Fay, II et al.

(10) Patent No.: US 10,306,829 B2
(45) Date of Patent: Jun. 4, 2019

(54) GROUND HEIGHT GAUGE ASSEMBLY

(71) Applicant: CNH Industrial America, LLC, New Holland, PA (US)

(72) Inventors: Jeffrey B. Fay, II, Oxford, PA (US); Terry S. Moyer, Denver, PA (US); Zachary Stephens, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/429,846

(22) Filed: Feb. 10, 2017

(65) Prior Publication Data
US 2018/0228080 A1 Aug. 16, 2018

(51) Int. Cl.
*A01D 41/14* (2006.01)
*A01D 34/24* (2006.01)
*A01D 34/00* (2006.01)
*A01D 34/04* (2006.01)
*A01D 47/00* (2006.01)
*G01B 5/14* (2006.01)

(52) U.S. Cl.
CPC ......... *A01D 34/243* (2013.01); *A01D 34/006* (2013.01); *A01D 34/04* (2013.01); *A01D 41/141* (2013.01); *A01D 47/00* (2013.01); *G01B 5/14* (2013.01)

(58) Field of Classification Search
CPC ...... A01D 41/141; A01D 41/14; A01D 41/06; A01D 41/127; A01D 89/004; A01D 89/002; A01D 89/003; A01D 57/20; A01D 84/00; A01D 46/08; A01D 34/243; A01D 34/006; A01D 34/04; A01D 47/00; G01B 5/14

USPC .............. 56/10.2 E, 10.2 R, 10.9, 15.2, 208; 172/2, 4, 4.5
See application file for complete search history.

(56) References Cited

U.S. PATENT DOCUMENTS

| 3,906,710 | A | 9/1975 | Pask |
| 5,299,413 | A | 4/1994 | Gale |
| 6,202,395 | B1 * | 3/2001 | Gramm ............... A01D 41/141 172/4 |
| 6,826,894 | B2 | 12/2004 | Thiemann et al. |
| 6,883,299 | B1 * | 4/2005 | Gramm ................. A01D 41/06 172/4 |

(Continued)

FOREIGN PATENT DOCUMENTS

EP 2865257 A1 10/2005

*Primary Examiner* — Robert E Pezzuto
(74) *Attorney, Agent, or Firm* — Patrick M. Sheldrake; Peter K. Zacharias

(57) ABSTRACT

A ground height gauge assembly is provided. The ground height gauge assembly includes a shaft configured to be rotatably coupled to the header. The ground height gauge assembly includes a first arm coupled to the shaft and configured to simultaneously rotate with the shaft, the first arm defining a first length. The ground height gauge assembly includes a second arm pivotally coupled to the shaft and defining a second length, the second arm configured to be mounted in a first position and a second position. The second length of the second arm is dimensioned greater than the first length of the first arm. In the first position the second arm is configured to rotate independently of the first arm. In the second position the second arm is configured to be coupled to the first arm such that rotation of the first arm simultaneously rotates the second arm.

19 Claims, 13 Drawing Sheets

(56) References Cited

U.S. PATENT DOCUMENTS

| | | |
|---|---|---|
| 7,730,700 B2 | 6/2010 | Nathan et al. |
| 8,146,335 B2 * | 4/2012 | Vandeven ............ A01D 41/141 56/10.2 E |
| 8,201,388 B1 * | 6/2012 | Vandeven ............ A01D 41/141 56/10.2 E |
| 9,693,505 B2 * | 7/2017 | Bassett .................. A01D 57/20 |
| 2005/0028504 A1 | 2/2005 | Gramm |
| 2006/0242935 A1 * | 11/2006 | Rayfield ............. A01D 41/141 56/10.2 E |

* cited by examiner

GROUND HEIGHT GAUGE ASSEMBLY

BACKGROUND

Harvesters, such as self-propelled windrowers, are used in the agricultural industry to harvest and/or a variety of crops. Headers having different components are interchanged on the windrower based on the desired operation and the type of crop being harvested and/or cut. Headers used for cutting crops generally include ground feeler arms or gauges that extend from the bottom of the header and control the overall height of the header relative to the ground, thereby regulating the stubble or cut height of the crop.

For example, FIG. 1 shows a side view of a traditional header 10. The header 10 includes an attachment mechanism 18 that can be used to detachably couple the header 10 to a harvester 20. Harvested crop can be introduced from the header 10 into the harvester 20 and, particularly into a processing system 30 of the harvester 20. The header 10 includes a housing 12 with a cutter bar 14 disposed at or near a bottom surface of the housing 12. Cut height cylinders (not shown) are generally mounted on the harvester base unit and act upon the lift arms. The header 10 includes multiple ground feeler arms or gauges 22 pivotally mounted to an axle 24 aft of the cutter bar 14. The angle at which the ground feeler arm 22 extend from the axle 24 control the position of the cutter bar 14 relative to the ground, thereby varying the desired stubble or cut height of the crop.

In particular, feedback information for the desired cut height is sent to a controller via multiple ground feeler arms 22. The arms 22 are pivoted from the axle 24, rotating down and up by an angle 26 from a position where the cutter bar 14 is contacting the ground to an elevated position where the cutter bar 24 is a predetermined distance above the ground. Raising the cutter bar 14 to a maximum height 28 (e.g., 18 inches) above the ground generally requires the arm 22 to rotate through a large arc, resulting in the arm 22 being nearly vertical when the cut height is set to the highest elevation or the header 10 is fully lifted at the end of a row. The vertical orientation of the arm 22 causes the arm 22 to dig into the ground when the header 10 is lowered from a full lift height (e.g., an elevation much higher than the cut height), preventing the header 10 from returning to the ground since the arms 22 dig into the ground and hold the header 10 up rather than sliding back under the header 10 as it is lowered.

The arm 22 shown in FIG. 1 can be replaced with a longer arm 22 for higher cut heights, since the longer arm 22 would not have as vertical of an angle 26 when lifted, allowing the arm 22 to slide back under the header 10 when the header 10 is lowered. However, longer arms 22 lose resolution as they rotate through less of an arc (fewer degrees of rotation) than a shorter arm 22 being lowered the same vertical distance. Such resolution is critical for low-level cutting close to the ground. Thus, manual interchanging of the arms 22 is generally necessary based on the desired cut height, resulting in a loss of harvesting time.

SUMMARY

Exemplary embodiments are directed one or a plurality of ground height gauge assemblies that can be mounted to a header and provide either arms of different lengths or a single telescoping arm that can be used to adjust the height of the header over the ground for a wide range of desired cut heights. In some embodiments, a short arm can be used for low-level cutting and a long arm can be coupled to the short arm for higher cut heights. In other embodiments, an overall length of a single telescoping arm can be adjusted based on the desired cut height. This configuration advantageously minimizes the amount of maintenance or set-up time required when changing the desired cut height, providing a single assembly that can be used for a wide range of cut heights.

In accordance with some embodiments of the present disclosure, an exemplary round height gauge assembly configured to be mounted to a header is provided. The ground height gauge assembly comprises a shaft configured to be rotatably coupled to the header. The ground height gauge assembly comprises a first arm coupled to the shaft and configured to simultaneously rotate with the shaft. The first arm defines a first length. The ground height gauge assembly comprises a second arm pivotally coupled to the shaft and defining a second length. The second arm can be configured to be mounted in a first position and a second position. The second length of the second arm is dimensioned greater than the first length of the first arm. In the first position the second arm is configured to rotate independently of the first arm. For example, the second arm can be freely rotated independently of the first arm into a stowed position such that only the first arm contacts the ground. In the second position the second arm is configured to be coupled to the first arm such that rotation of the first arm simultaneously rotates the second arm (e.g., both arms rotate together and only the second arm contacts the ground).

The first arm can be rigidly coupled to the shaft. A proximal end of the second arm can include fixation ring concentrically disposed around the shaft. In the first position, the fixation ring can rotate freely around the shaft. A distal end of the first and second arms can include a rounded edge configured to be disposed against the ground. The first arm can include a flange with an opening passing therethrough, and the second arm can include a flange with a complementary opening passing therethrough. The ground height gauge assembly comprises an elongated pin removably passing through the openings of the flanges of the first and second arms, the elongated pin releasably coupling the first arm to the second arm such that both arms rotate together. In particular, passing the elongated pin through the openings of the flanges of the first and second arms results in the second arm being mounted in the second position.

The ground height gauge assembly comprises a frame with one or more tabs having an opening passing therethrough. In some embodiments, an elongated pin removably passes through the opening of the flange in the second arm and the opening in the tab of the frame, resulting in the second arm being mounted in a stowed position (e.g., non-rotatably positioned relative to the shaft). The ground height gauge assembly comprises a sensor coupled to the shaft. In some embodiments, the sensor is a potentiometer.

In accordance with some embodiments of the present disclosure, an exemplary ground height gauge assembly configured to be mounted to a header is provided. The ground height gauge assembly comprises a shaft configured to be rotatably coupled to the header. The ground height gauge assembly comprises a telescoping arm coupled to the shaft and configured to simultaneously rotate with the shaft. The arm comprises a first section rigidly coupled to the shaft and a second section slidably mounted to the first section. Sliding the second section of the telescoping arm relative to the first section of the telescoping arm varies an overall length of the telescoping arm.

A distal end of the telescoping arm comprises a rounded edge configured to be disposed against the ground. The ground height gauge assembly comprises a frame with one or more tabs having an opening passing therethrough. The telescoping arm comprises a flange with a complementary opening passing therethrough. In some embodiments, the ground height gauge assembly comprises an elongated pin removably passing through the opening of the tab and the opening of the flange, resulting in the telescoping arm being mounted in a stowed position. In some embodiments, the ground height gauge assembly comprises a first set of apertures formed in the first section of the telescoping arm, and a second set of apertures formed in the second section of the telescoping arm. In some embodiments, the ground height gauge assembly comprises an adjustment pin passing through aligned apertures of the first and second set of apertures, the adjustment pin coupling the first section of the telescoping arm to the second section of the telescoping arm. In some embodiments, the ground height gauge assembly comprises a potentiometer coupled to the shaft.

In accordance with some embodiments of the present disclosure, an exemplary harvester header is provided. The harvester header comprises a frame and a cutter bar mounted to the frame. The harvester header comprises one or more ground height gauge assemblies mounted to the frame. Each of the one or more ground height gauge assemblies can include one of two designs. As a first design, each ground height gauge assembly comprises a shaft configured to be rotatably coupled to the header, a first arm coupled to the shaft and configured to simultaneously rotate with the shaft, the first arm defining a first length, and a second arm pivotally coupled to the shaft and defining a second length, the second arm configured to be mounted in a first position and a second position. The second length of the second arm is dimensioned greater than the first length of the first arm. In the first position the second arm is configured to rotate independently of the first arm. In the second position the second arm is configured to be coupled to the first arm such that rotation of the first arm simultaneously rotates the second arm. As a second design, each ground height gauge assembly comprises a shaft configured to be rotatably coupled to the header, and a telescoping arm coupled to the shaft and configured to simultaneously rotate with the shaft, the arm including a first section rigidly coupled to the shaft and a second section slidably mounted to the first section. Sliding the second section of the telescoping arm relative to the first section of the telescoping arm varies an overall length of the telescoping arm. In some embodiments, each ground height gauge assembly comprises a potentiometer coupled to the shaft.

In accordance with some embodiments of the present disclosure, an exemplary harvester (e.g., a windrower) is provided. The harvester comprises a header including a frame, a cutter bar mounted to the frame, and one or more ground height gauge assemblies mounted to the frame. Each of the one or more ground height gauge assemblies can include one of two designs. As a first design, each ground height gauge assembly comprises a shaft configured to be rotatably coupled to the header, a first arm coupled to the shaft and configured to simultaneously rotate with the shaft, the first arm defining a first length, and a second arm pivotally coupled to the shaft and defining a second length, the second arm configured to be mounted in a first position and a second position. The second length of the second arm is dimensioned greater than the first length of the first arm. In the first position the second arm is configured to rotate independently of the first arm. In the second position the second arm is configured to be coupled to the first arm such that rotation of the first arm simultaneously rotates the second arm. As a second design, each ground height gauge assembly comprises a shaft configured to be rotatably coupled to the header, and a telescoping arm coupled to the shaft and configured to simultaneously rotate with the shaft, the arm including a first section rigidly coupled to the shaft and a second section slidably mounted to the first section. Sliding the second section of the telescoping arm relative to the first section of the telescoping arm varies an overall length of the telescoping arm. In some embodiments, each ground height gauge assembly comprises a potentiometer coupled to the shaft. In some embodiments, the harvester comprises a processing system configured to process crop introduced into the processing system from the header.

In accordance with some embodiments of the present disclosure, an exemplary method of adjusting a ground height gauge assembly of a header is provided. The method comprises providing a ground height gauge assembly including a shaft configured to be rotatably coupled to the header, a first arm coupled to the shaft and configured to simultaneously rotate with the shaft, the first arm defining a first length, and a second arm pivotally coupled to the shaft and defining a second length. The second length of the second arm is dimensioned greater than the first length of the first arm. The method comprises mounting the second arm in a first position in which the second arm is configured to rotate independently of the first arm. In the first position, the second arm can be coupled to the frame of the ground height gauge assembly such that only the first arm contacts the ground. The method comprises mounting the second arm in a second position in which the second arm is coupled to the first arm such that rotation of the first arm simultaneously rotates the second arm. In some embodiments, in the second position, only the second arm contacts the ground.

In accordance with some embodiments of the present disclosure, an exemplary method of adjusting a ground height gauge assembly of a header is provided. The method comprises providing a ground height gauge assembly including a shaft configured to be rotatably coupled to the header, and a telescoping arm coupled to the shaft and configured to simultaneously rotate with the shaft. In some embodiments, the arm comprises a first section rigidly coupled to the shaft and a second section slidably mounted to the first section. In some embodiments, the method comprises sliding the second section of the telescoping arm relative to the first section of the telescoping arm to vary an overall length of the telescoping arm.

In accordance with some embodiments of the present disclosure, exemplary methods of operating a harvester header are provided. The methods comprise coupling first and second arms of a ground height gauge assembly together such that the longer second arm is used to contact the ground or adjusting an overall length of a single telescoping arm of a ground height gauge assembly, thereby customizing the cut height of the header. One type of ground height gauge assembly can therefore be used to efficiently adjust the cut height of the header.

In accordance with some embodiments of the present disclosure, exemplary methods of operating a harvester are provided. The methods comprise coupling first and second arms of a ground height gauge assembly together such that the longer second arm is used to contact the ground or adjusting an overall length of a single telescoping arm of a ground height gauge assembly. One type of ground height gauge assembly can therefore be used to efficiently adjust the cut height of the header.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed ground height gauge assemblies, reference is made to the accompanying figures, wherein.

DETAILED DESCRIPTION

Figure 1:
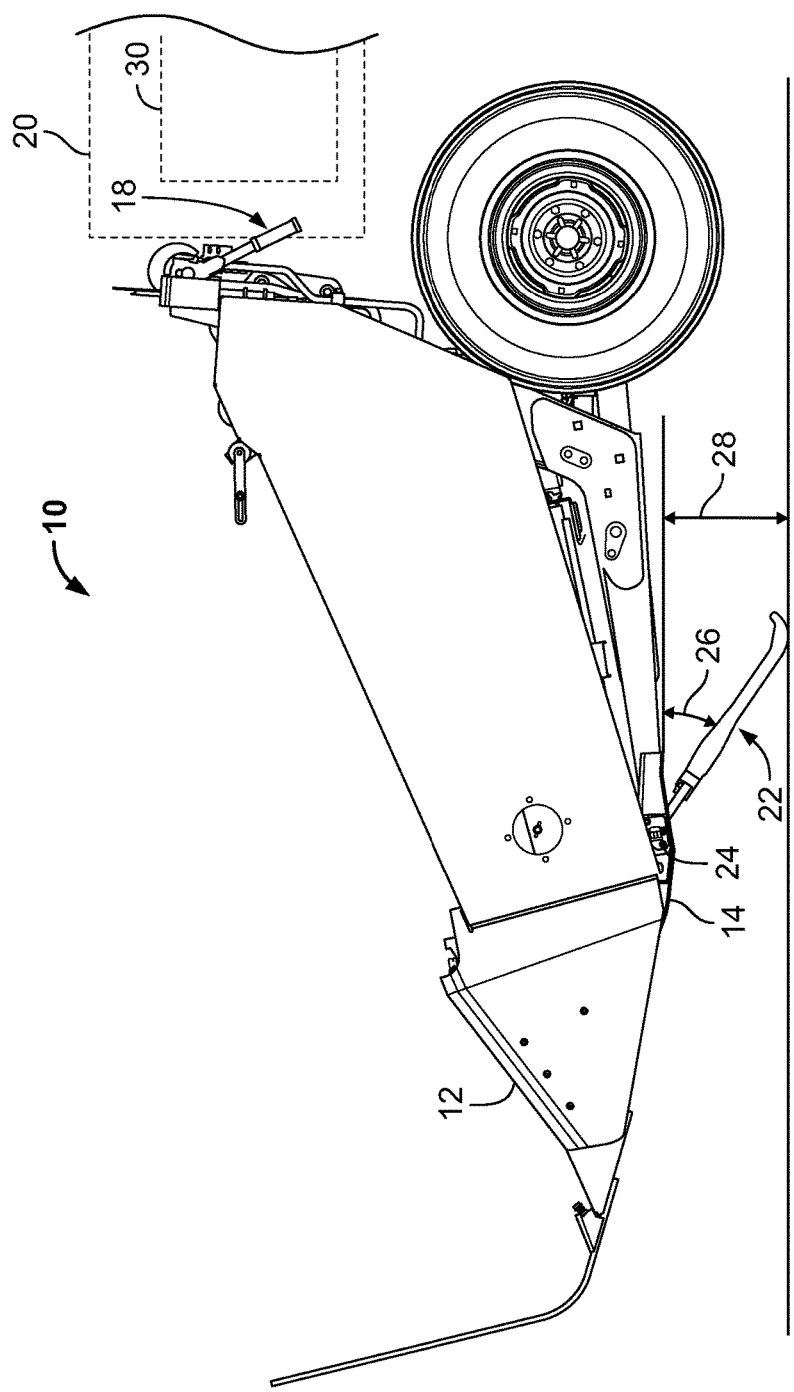
FIG. 1 is a side view of a traditional harvester including a header with a ground feeler arm or gauge.

It should be understood that the relative terminology used herein, such as "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are merely for an exemplary purpose and are not intended to limit the invention to embodiments having particular dimensions.

In some embodiments, an exemplary ground height gauge assembly provides a first arm and a second arm, the second arm being dimensioned longer than the first arm. In some embodiments, the longer arm can be coupled and decoupled relative to the first arm to allow the operator to only use the longer arm when cutting at much higher cut heights. For example, the operator can decouple the second arm from the first arm, couple the second arm to the frame in a stowed position, and use the first arm to cut crop at heights ranging from, for example, approximately 2 inches to approximately 16 inches. For higher crop cut heights such as, for example, approximately 17 inches to approximately 24 inches, the operator can couple the second arm directly to the first arm, allowing the second arm to contact the ground at the higher cut heights without being in a substantially vertical orientation, thereby enabling the header to be dropped without the arms digging into the ground. In some embodiments, rather than two arms, a single telescoping arm can be used such that the overall length of the arm can be varied to accommodate a wide range of cut heights.

As will be discussed in greater detail below, the first arm (e.g., optimized short arm) or the telescoping arm can be connected directly to the pivot shaft or axle of the ground height sensor assembly, causing the shaft to pivot as the arm moves up and down along the ground. The shaft of the ground height sensor assembly can be coupled to a potentiometer that provides ground height feedback to a controller. The second arm (e.g., longer arm) can be pivotally coupled to the same shaft (or a different shaft) and includes provisions or flanges allowing the second arm to be releasably coupled to the bottom of the header via a pin (thereby not influencing the sensor assembly coupled to the shaft) in a first position, or coupled to the first arm in a second position, thereby influencing rotation of the shaft by providing the ground contact location of the sensor assembly. The longer arm or the longer length of the telescoping arm allow the arms to maintain an optimized angle with respect to the ground at both an intermediate and elevated cut height. The exemplary ground height gauge assemblies maintain resolution on the potentiometer while allowing the higher cut height settings.

FIGS. 2-7 show perspective and detailed views of an exemplary ground height gauge assembly 100 (hereinafter "assembly 100") with components in different extended and non-extended/stowed positions. The assembly 100 can be incorporated into any type of header to be used with a harvester, such as header 10 and harvester 20 of FIG. 1. The assembly 100 includes a frame 102 that can be mounted to a cutter bar 104 on the header. The assembly 100 includes an axle or shaft 106 rotatably or pivotally mounted to the frame 102. The assembly 100 further includes a sensor 108 (e.g., a potentiometer) coupled to the shaft 106. The sensor 108 detects changes in the rotational position of the shaft 106 and transmits feedback signals regarding the rotational position of the shaft 106 to a controller. The controller, in turn, regulates the height of the cutter bar 104 to maintain the desired cut height of the crop.

The assembly 100 includes a first arm 110 (e.g., a short or optimized arm) and a second arm 112 (e.g., a long arm). The first arm 110 includes a proximal end 114 at the connection with the shaft 106 and an opposing distal end 116, with the overall length of the first arm 110 being measured between the proximal and distal ends 114, 116. The second arm 112 includes a proximal end 118 at the connection with the shaft 106 and an opposing distal end 120, with the overall length of the second arm 112 being measured between the proximal and distal ends 118, 120. The overall length of the second arm 112 is dimensioned greater than the overall length of the first arm 110.

The proximal end 114 of the first arm 110 is fixedly coupled to the shaft 106 at a connection 122 such that the first arm 110 rotates simultaneously with the shaft 106. The first arm 110 includes a first section 124 and a second section 126 releasably coupled to each other by a flange 128. In some embodiments, the first section 124 can define an elongated, square, rectangular, round, or oval tube or block fabricated from a metal material, and the second section 126 can be fabricated from a rubber material. The rubber material of the second section 126 provides a dampening effect when the second section 126 contacts the ground, thereby reducing the impact of changes in terrain on the assembly 100. The second section 126 can include an elongated portion 130 at a proximal end and connected via the flange 128 to the first section 126, and further includes a hook-like portion 132 with a rounded edge 134 configured to be in contact with the ground. The coupling via the flange 128 allows the second section 128 to be replaced due to wear or damage.

The proximal end 118 of the second arm 112 includes a fixation ring 136 concentrically disposed around the shaft 106 such that the second arm 112 can freely rotate relative to the shaft 106. Although illustrated as connected to the same shaft 106, in some embodiments, the second arm 112 can be connected to a different shaft, and coupling the first and second arms 110, 112 ensures that terrain changes are reflected on the shaft 106. The second arm 112 can be mounted in a first position or a second position. In the first position, the second arm 112 can rotate independently of the first arm 110 and can be secured in a stowed configuration. In the second position, the second arm 112 can be releasably coupled to the first arm 110 such that rotation of the first arm 110 simultaneously rotates the second arm 112, and vice versa.

The second arm 112 can be configured substantially similarly to the first arm 110. In particular, the second arm 112 also includes a first section 138 and a second section 140 releasably coupled to each other by a flange 142. In some embodiments, the first section 138 can define an elongated, square, rectangular, round, or oval tube or block fabricated from a metal material, and the second section 140 can be fabricated from a rubber material. The second section 140 can include an elongated portion 144 at a proximal end and connected via the flange 142 to the first section 138, and further includes a hook-like portion 146 with a rounded edge 148 configured to be in contact with the ground. The second arm 112 includes a second flange 150 coupled to or extending from a top surface of the first section 138 and spaced from the flange 142.

In some embodiments, the first section 138 of the second arm 112 can be dimensioned longer than the first section 124 of the first arm 110, while the second sections 126, 140 are dimensioned substantially equally. In some embodiments, the first sections 138, 124 can be dimensioned substantially equally, while the second section 140 of the second arm 112 is dimensioned longer than the second section 126 of the first arm 110. In some embodiments, both the first and second sections 138, 140 of the second arm 112 can be dimensioned longer than the first and second sections 124, 126 of the first arm 112.

The frame 102 includes one or more tabs 152, 154 extending perpendicularly from an inner surface of the frame 102 (e.g., within an enclosure formed between the cutter bar 104 and the frame 102). Each tab 152, 154 includes an opening 156, 158 passing therethrough. Each of the flanges 128, 142 includes a section extending over the first section 124, 138 with an opening 160, 162 passing therethrough. The second flange 150 of the second arm 112 also includes an opening 164 passing therethrough. The second flange 150 is positioned such that when the first and second arms 110, 112 are rotatably disposed adjacent to each other, the opening 164 of the second flange 150 aligns with the opening 160 of the flange 128 of the first arm 110 (see, e.g., FIG. 4).

The openings 160, 164 are configured and dimensioned to removably receive an elongated pin 166 (e.g., a coupling pin) therethrough. The elongated pin 166 can include a secondary locking pin 168 that prevents undesired removal of the elongated pin 166 from the openings 160, 164. The elongated pin 166 can be used to mount the second arm 112 in the second or stowed position, can be used to couple the second arm 112 in the first position (e.g., coupled to the first arm 110), or can be used to couple the first and second arms 110, 112 in the stowed position.

Figure 2:
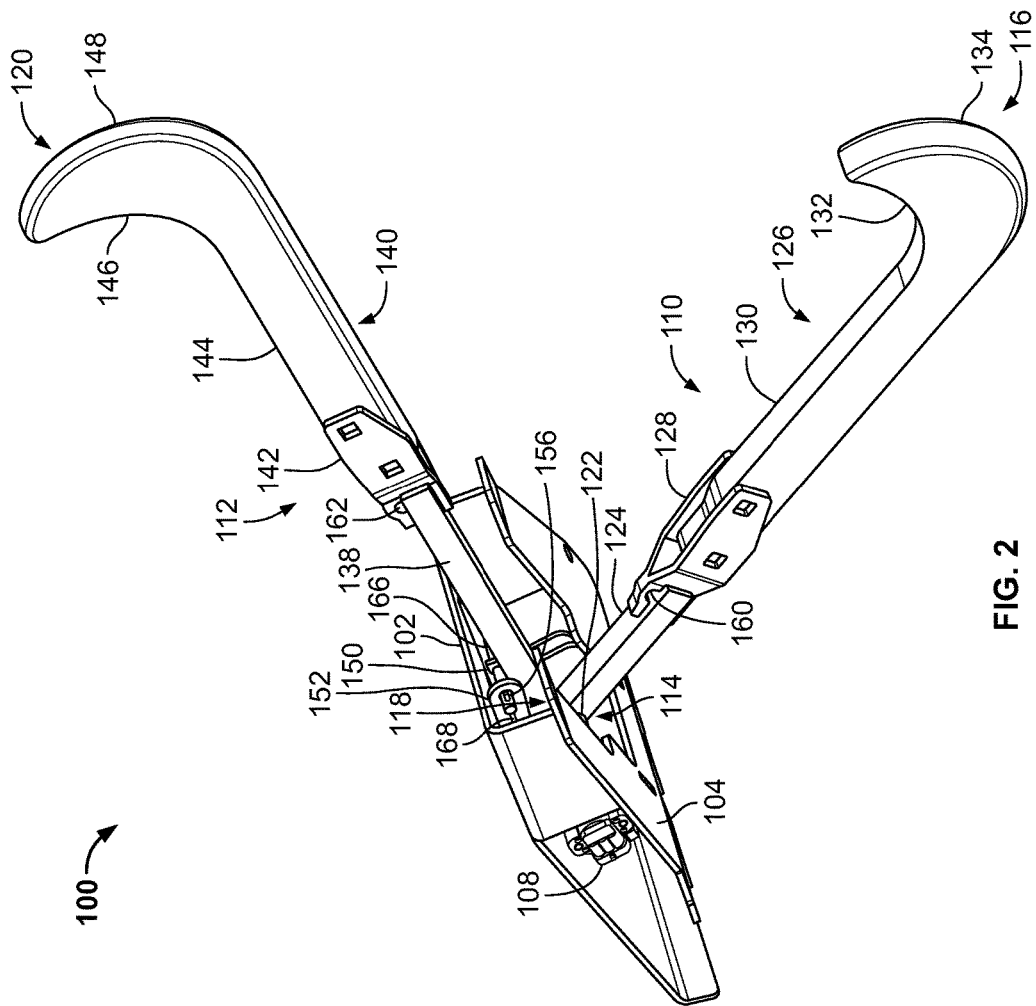
FIG. 2 is a perspective view of an exemplary ground height gauge assembly including a first arm in an extended position and a second arm in a stowed position.
Figure 3:
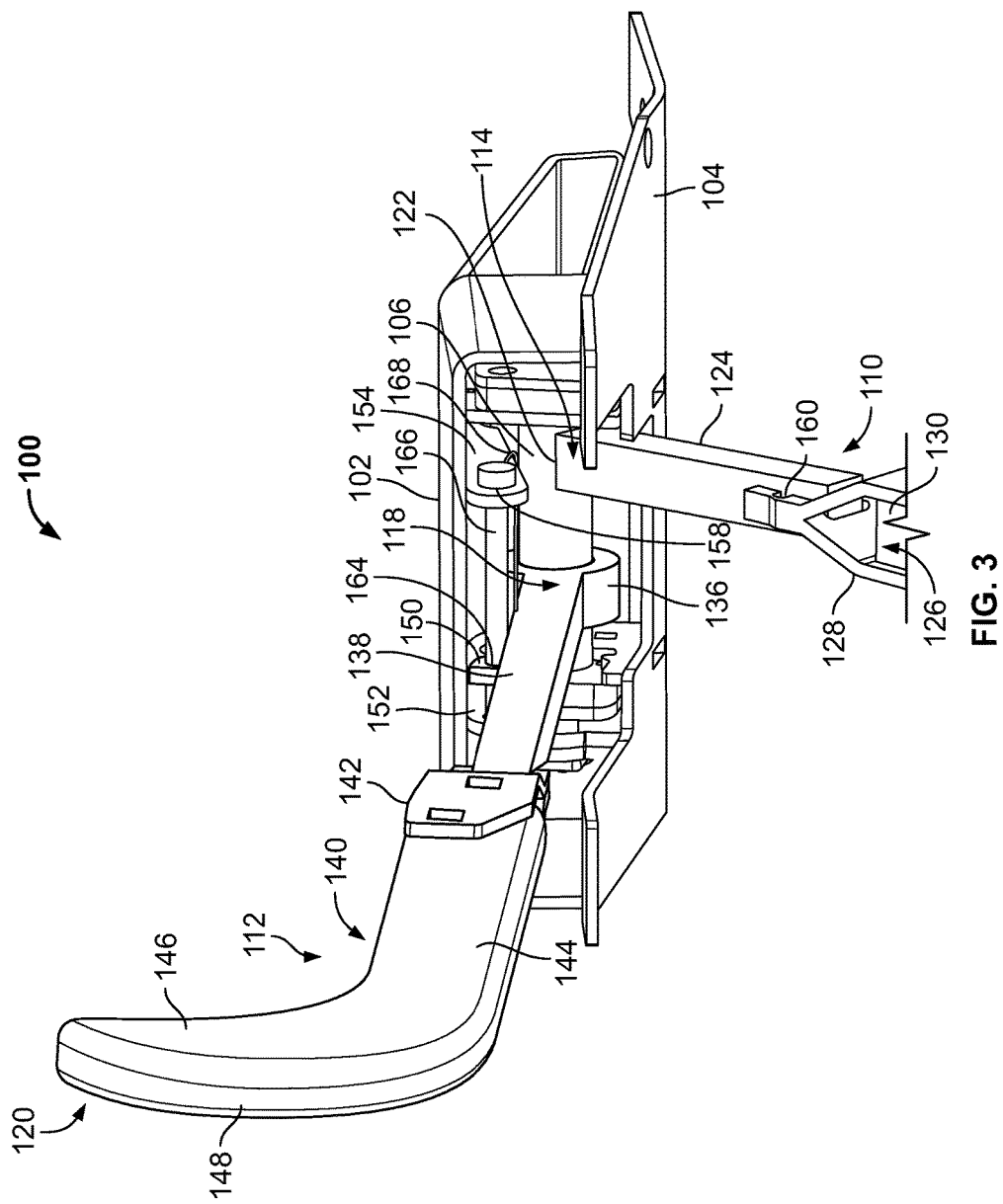
FIG. 3 is a detailed, perspective view of an exemplary ground height gauge assembly including a first arm in an extended position and a second arm in a stowed position.
Figure 4:
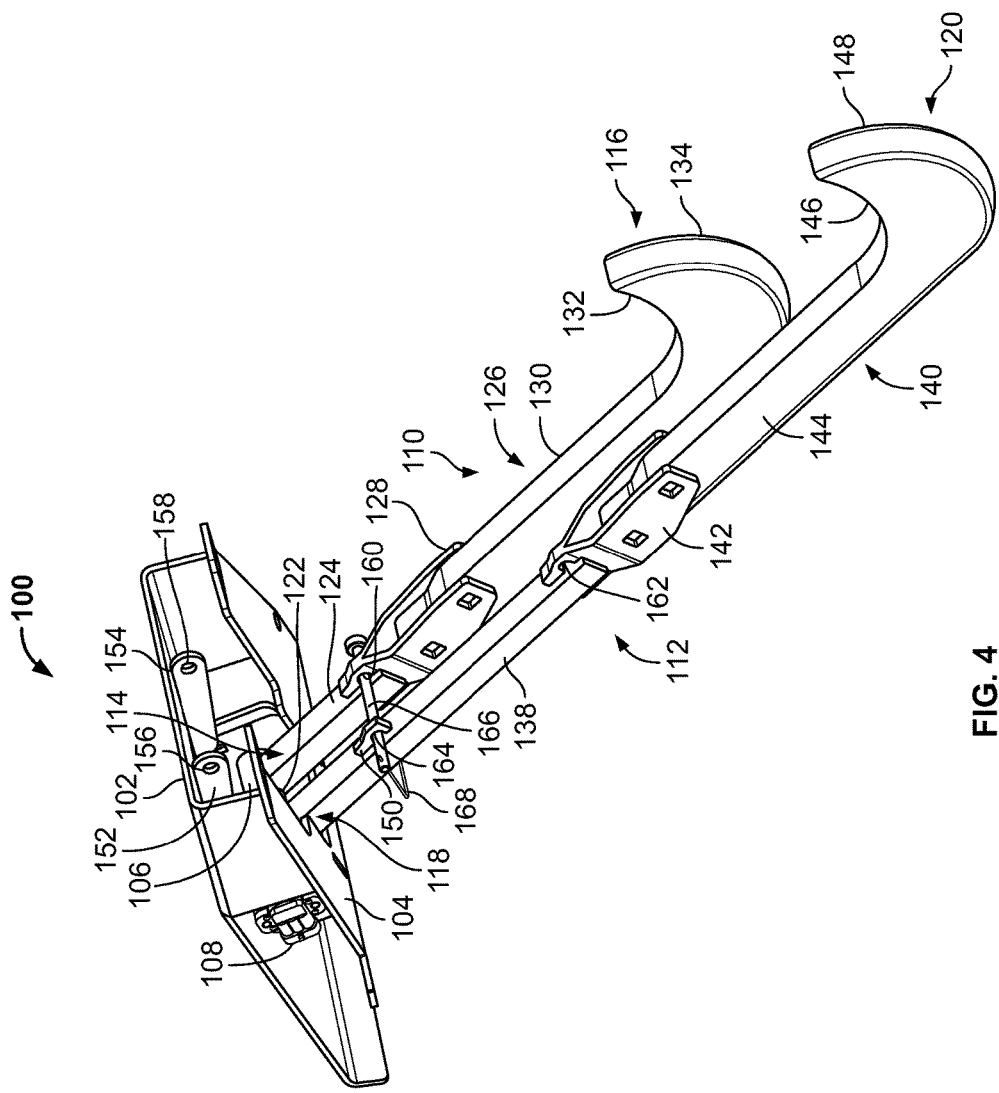
FIG. 4 is a perspective view of an exemplary ground height gauge assembly including first and second arms coupled together in an extended position.
Figure 5:
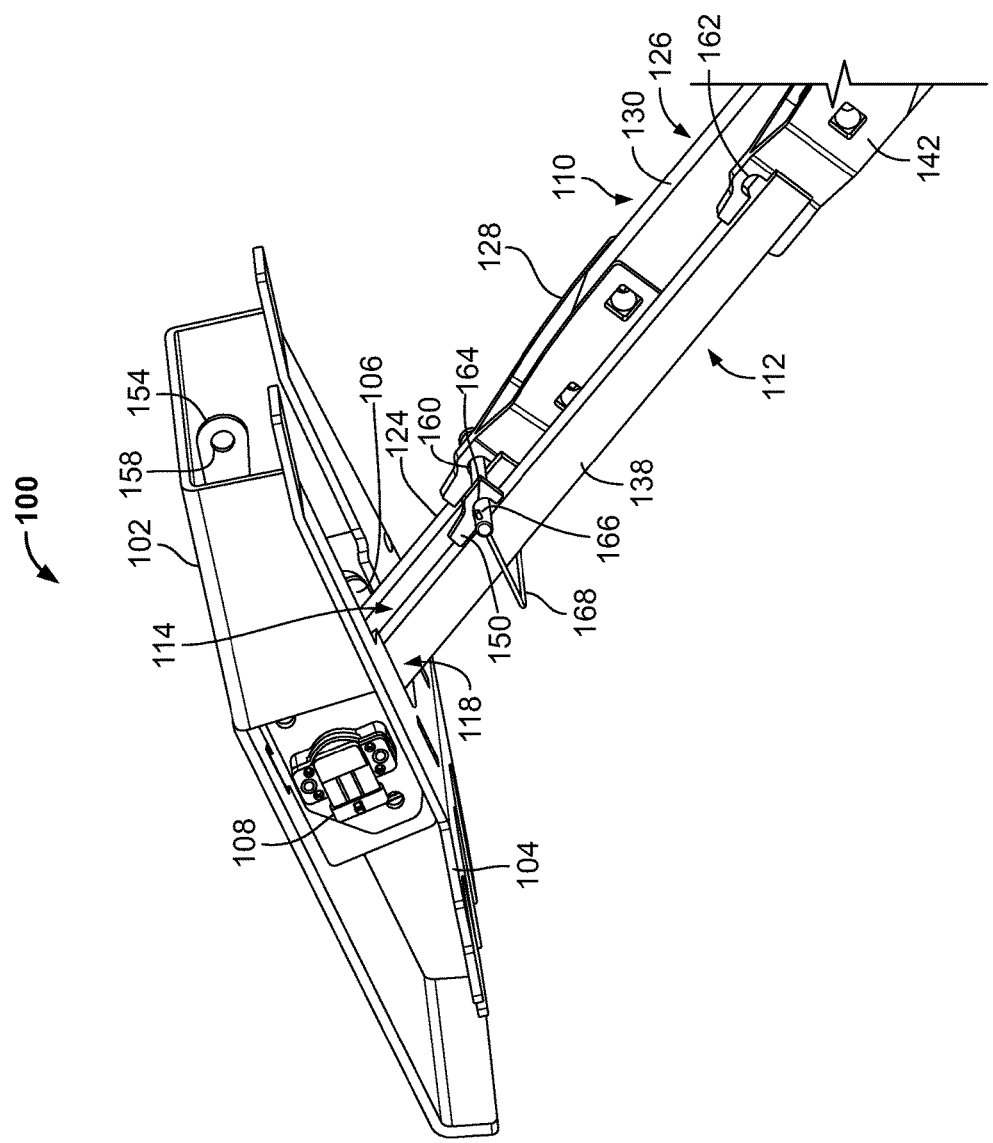
FIG. 5 is a side, perspective view of an exemplary ground height gauge assembly including first and second arms coupled together in an extended position.
Figure 6:
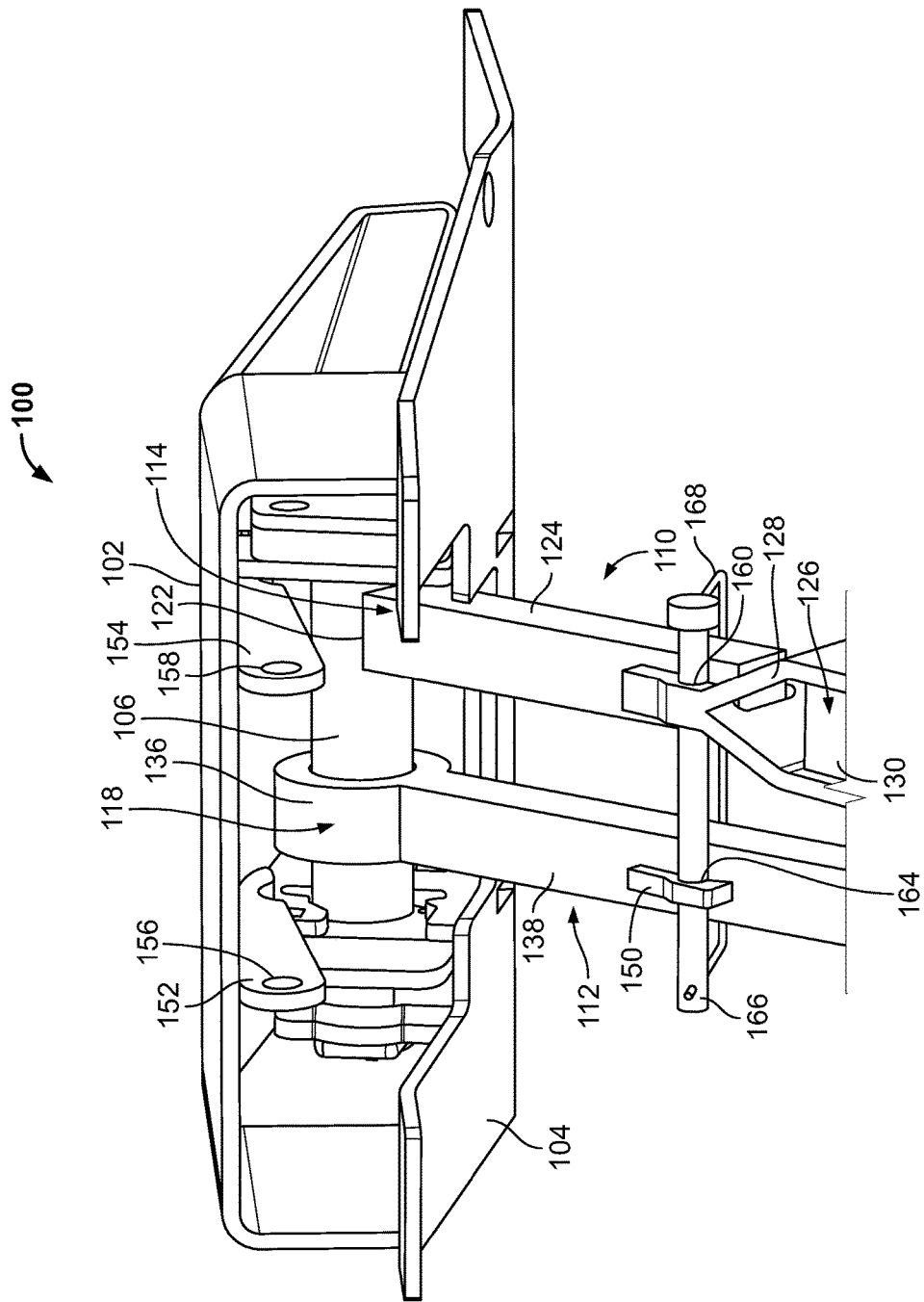
FIG. 6 is a detailed, perspective view of an exemplary ground height gauge assembly including first and second arms coupled together in an extended position.
Figure 7:
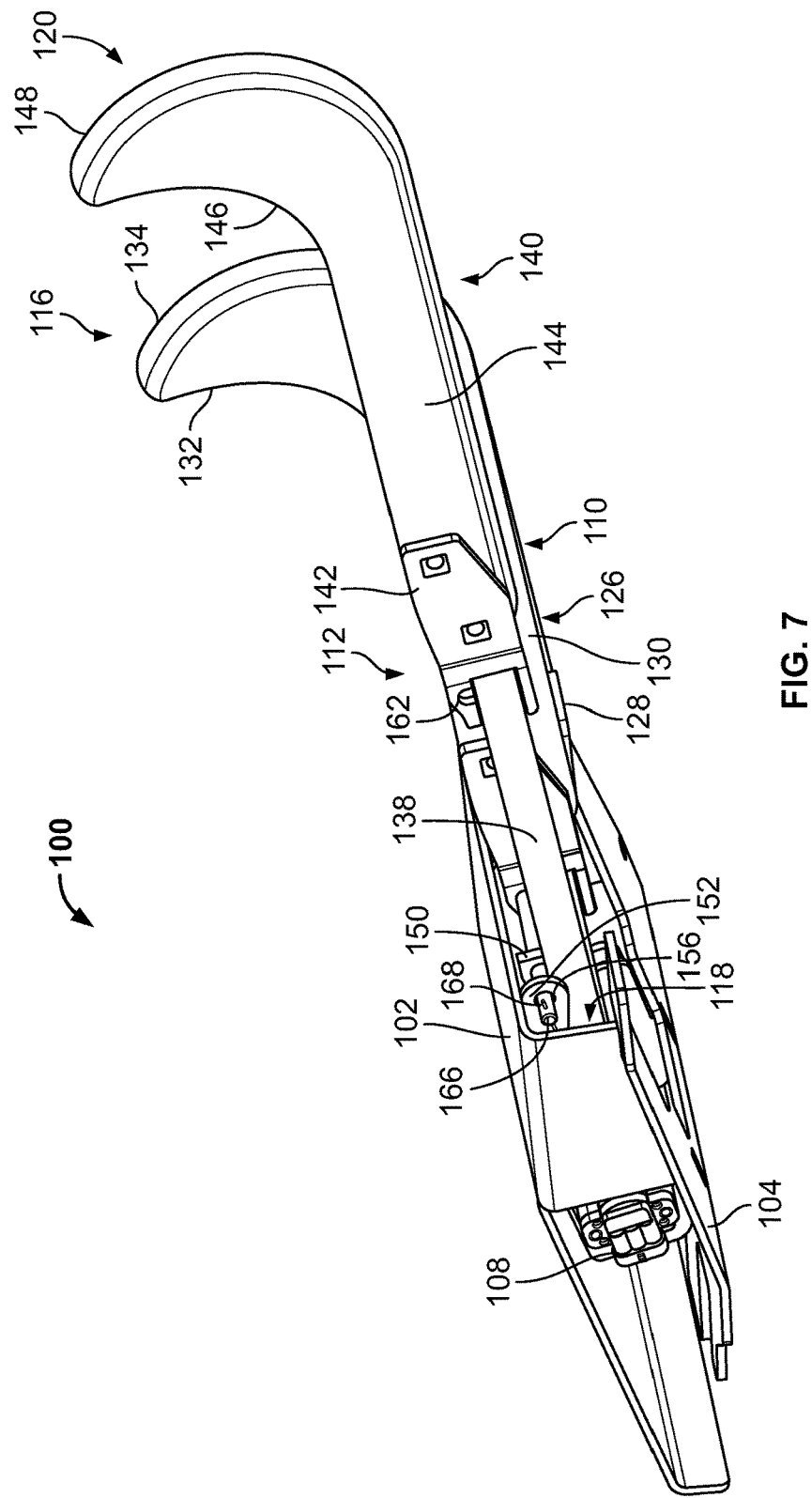
FIG. 7 is a side, perspective view of an exemplary ground height gauge assembly including first and second arms coupled together in a stowed position.

For example, as shown in FIGS. 2 and 3, the second arm 112 can be independently rotated upward against the frame 102 such that the opening 164 aligns with the opening 156 of the tab 152. The elongated pin 166 can be passed through the openings 156, 164 to maintain the second arm 112 in the second or stowed position while only the first arm 110 is being used in the extended position. As a further example, as shown in FIGS. 4-6, the second arm 112 can be independently rotated into the extended position such that the openings 160, 164 are substantially aligned. The elongated pin 166 can be passed through the openings to couple the first and second arms 110, 112 together in the extended position, such that the second arm 112 contacts the ground at a non-perpendicular orientation relative to the frame 102. As a further example, as shown in FIG. 7, both the first and second arms 110, 112 can be rotated into the stowed position against the frame 102 such that the openings 156, 158 of the tabs 152, 154 are aligned with the openings 160, 164. The elongated pin 166 can be passed through the openings 156, 158, 160, 164 to maintain the first and second arms 110, 112 in the stowed position while the assembly 100 is not in use.

Thus, the first arm 110 can be positioned in the extended configuration to cut crop heights ranging from, for example, approximately 2 inches to approximately 16 inches, while the second arm 112 is positioned in the stowed configuration. For higher crop cut heights such as, for example, approximately 17 inches to approximately 24 inches, the second arm 112 can be fixedly coupled to the first arm 110 such that the longer length of the second arm 112 maintains the higher cut crop heights without being disposed in a substantially perpendicular orientation relative to the ground. In each configuration, the first arm 110 remains fixedly coupled to the shaft 106 such that changes in terrain in contact with the distal end 116, 120 of the first or second arm 110, 112 causes pivoting of the shaft 106 which, in turn is detected by the sensor 108 and transmitted to the controller for adjusting the cutter bar 104.

For example, when the first arm 110 is in the extended position and the second arm 112 is in the stowed position (e.g., FIGS. 2 and 3), changes in terrain impart forces on the first arm 110 which directly causes pivoting of the shaft 106 to be detected by the sensor 108. When the second arm 112 is coupled to the first arm 110 in the extended position, changes in terrain impart forces on the second arm 112 which indirectly transmits the forces to the first arm 110, the first arm 110 causing pivoting of the shaft 106 to be detected by the sensor 108.

Manual or automatic adjustment of the cutter bar 104 can be performed based on the signals transmitted from the sensor 108. In some embodiments, the lowering and raising of the first and second arms 110, 112 can be performed manually and/or in an automated/powered manner. For example, the assembly 100 can include an actuation mechanism configured to lower and/or raise the first and second arms 110, 112, and a coupling mechanism configured to couple the first and second arms 110, 112 with the elongated pin 166.

Figure 8:
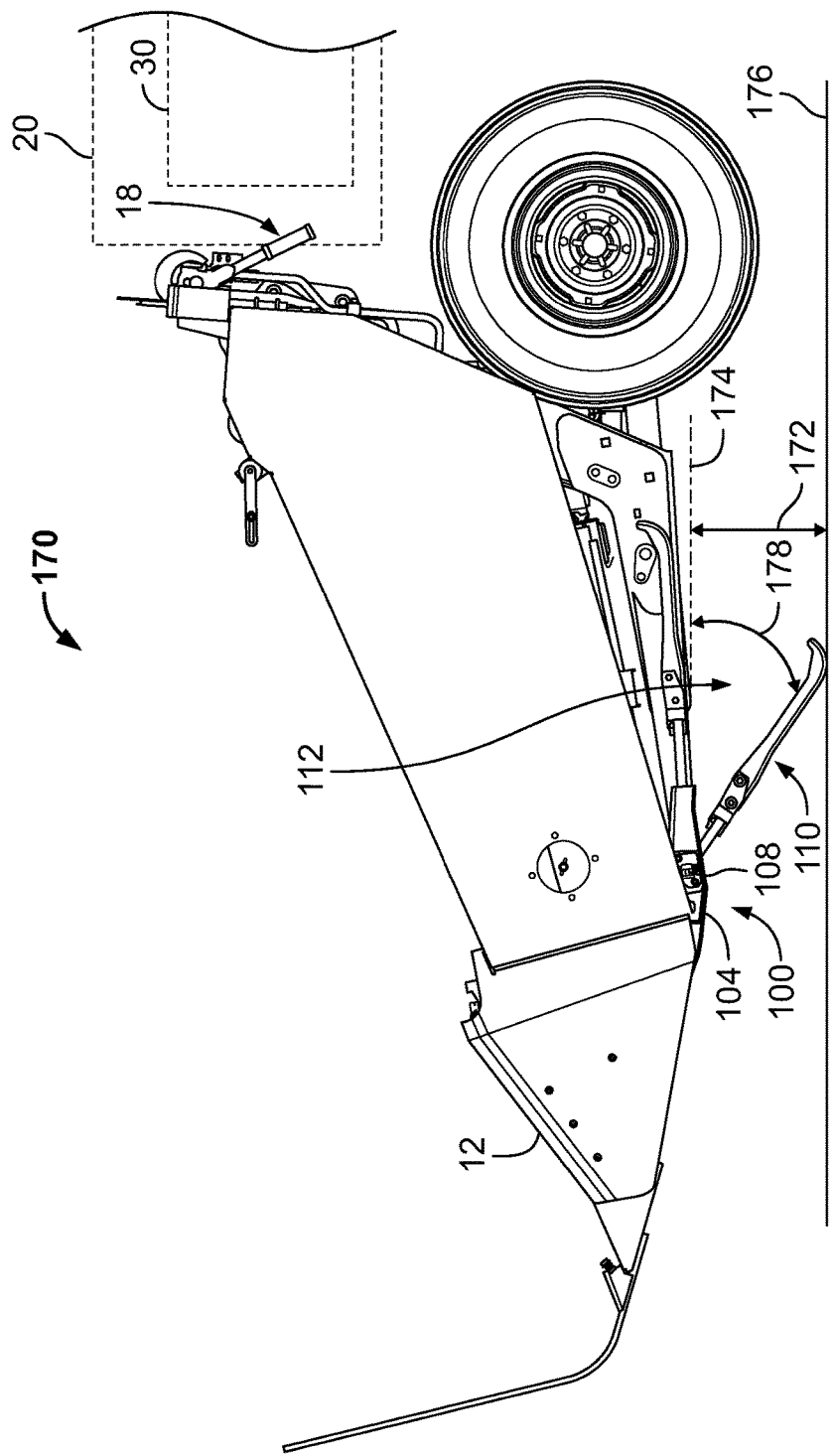
FIG. 8 is a side view of an exemplary header including a ground height gauge assembly with a first arm in an extended position and a second arm in a stowed position.
Figure 9:
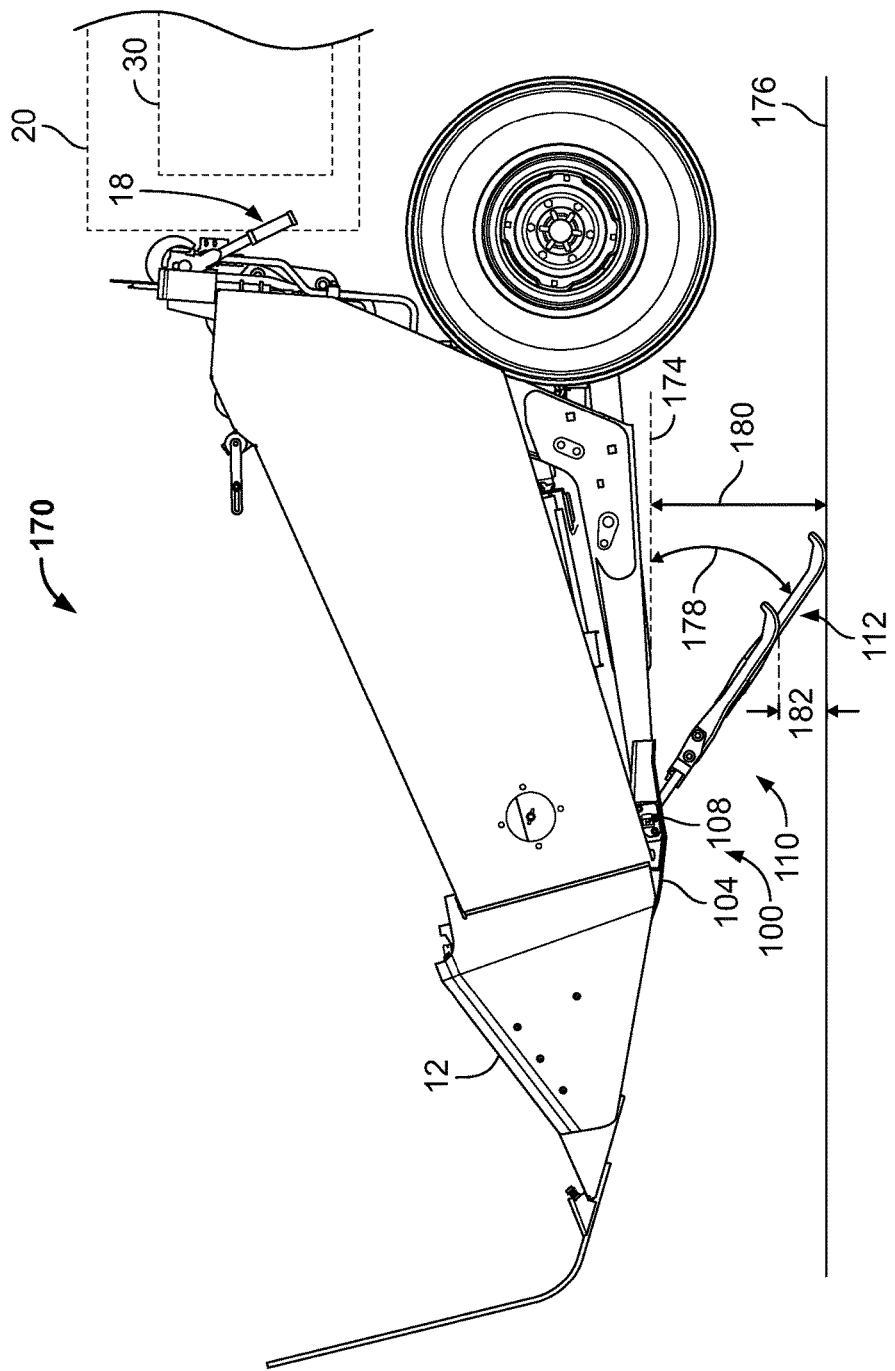
FIG. 9 is a side view of an exemplary header including a ground height gauge assembly with first and second arms coupled together in an extended position.

FIGS. 8 and 9 are side views of an exemplary header 170 including the assembly 100. The header 170 can be substantially similar to the header 10 of FIG. 1, except of the inclusion of the assembly 100. Therefore, like reference numbers are used to refer to like structures. FIG. 8 shows the first arm 110 of the assembly 100 disposed in an extended configuration, and the second arm 112 of the assembly 100 disposed in the second or stowed position. The configuration of FIG. 8 can be used for short cut crop heights corresponding to the height 172 between the ground 176 and a plane 174 extending through the header 170 and substantially parallel to the ground 176. In the configuration of FIG. 8, an angle 178 of the first arm 110 relative to the plane 174 can be varied depending on the desired crop cut height while preventing the first arm 110 from being disposed in a substantially perpendicular or vertical orientation relative to the plane 174.

FIG. 9 shows the first and second arms 110, 112 of the assembly 100 coupled together and disposed in an extended configuration. The configuration of FIG. 9 can be used for longer cut crop heights corresponding to the height 180 between the ground 176 and the plane 174. As noted in FIG. 9, the height 180 is dimensioned greater than the height 172 by a height differential 182. The angle 178 of the second arm 112 (and the first arm 110 coupled to the second arm 112) can be varied depending on the desired crop cut height while preventing the second arm 112 from being disposed in a substantially perpendicular or vertical orientation relative to the plane 174. Therefore, the assembly 100 can advantageously be used for a wide range of cut crop heights.

Figure 10:
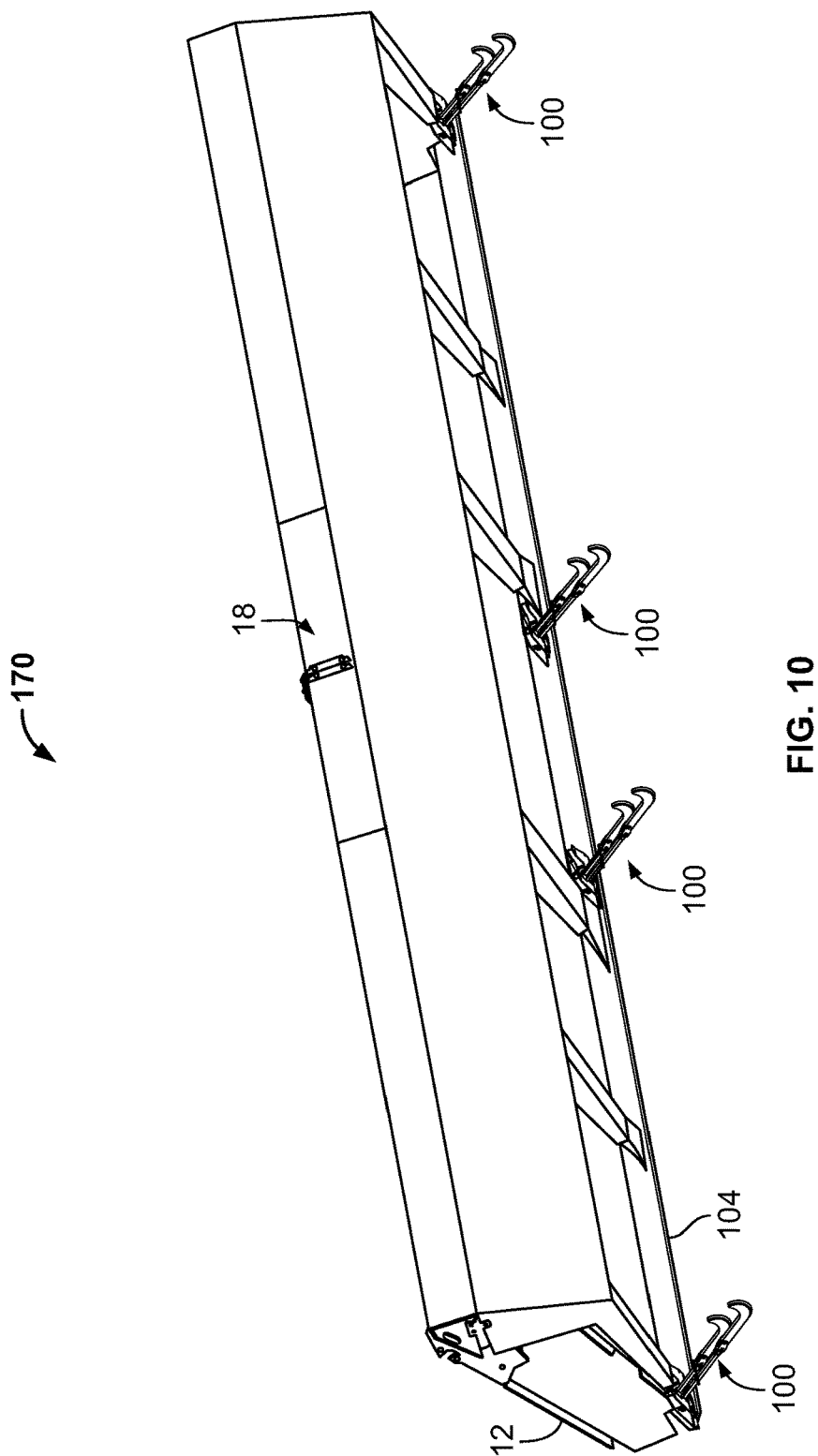
FIG. 10 is a bottom, perspective view of a header including exemplary ground height gauge assemblies with first and second arms coupled together in an extended position.

FIG. 10 is a bottom, perspective view of the header 170 including multiple assemblies 100. Each assembly 100 includes first and second arms 110, 112, which in FIG. 10 are shown coupled together and both in the extended configuration. The assemblies 100 can be connected to the same or different shafts 106 such that one or more sensors 108 can be used to detect changes in terrain across the entire header 170. Although illustrated with four assemblies 100, it should be understood that any number of assemblies 100 can be used.

Figure 11:
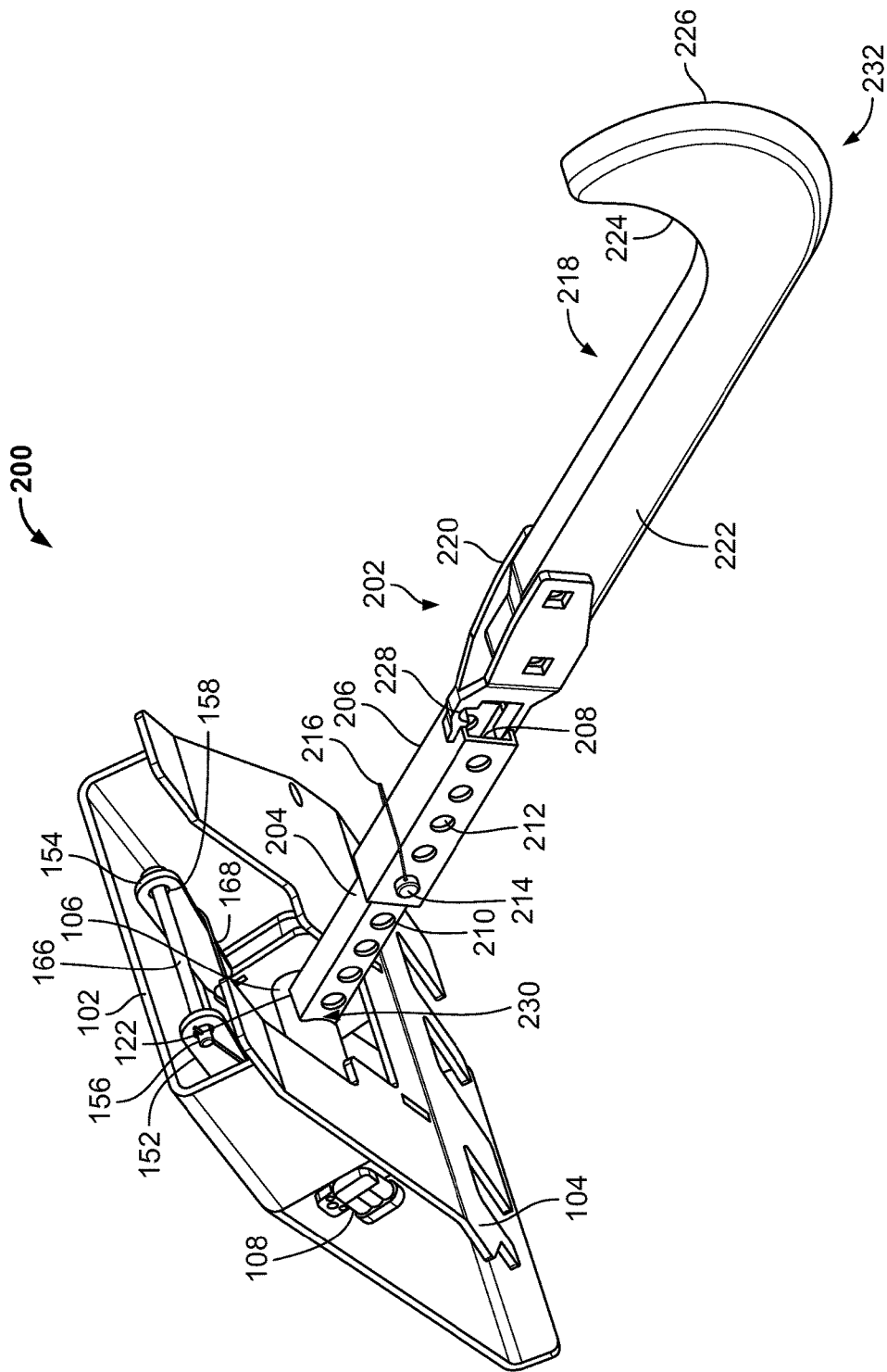
FIG. 11 is a perspective view of an exemplary ground height gauge assembly including a telescoping arm in an extended position, with first and second sections of the telescoping arm in a lengthened configuration.
Figure 12:
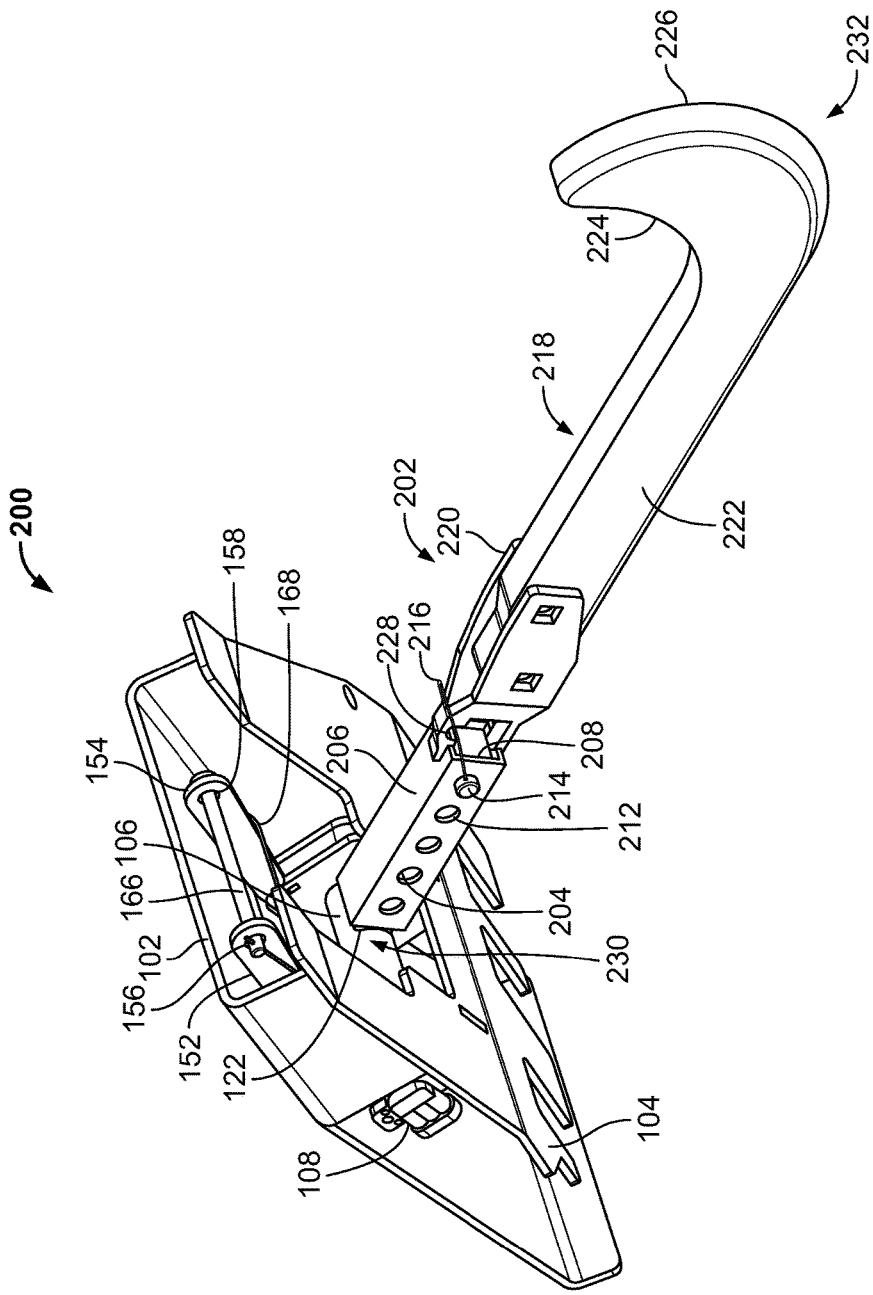
FIG. 12 is a perspective view of an exemplary ground height gauge assembly including a telescoping arm in an extended position, with first and second sections of the telescoping arm in a shortened configuration.
Figure 13:
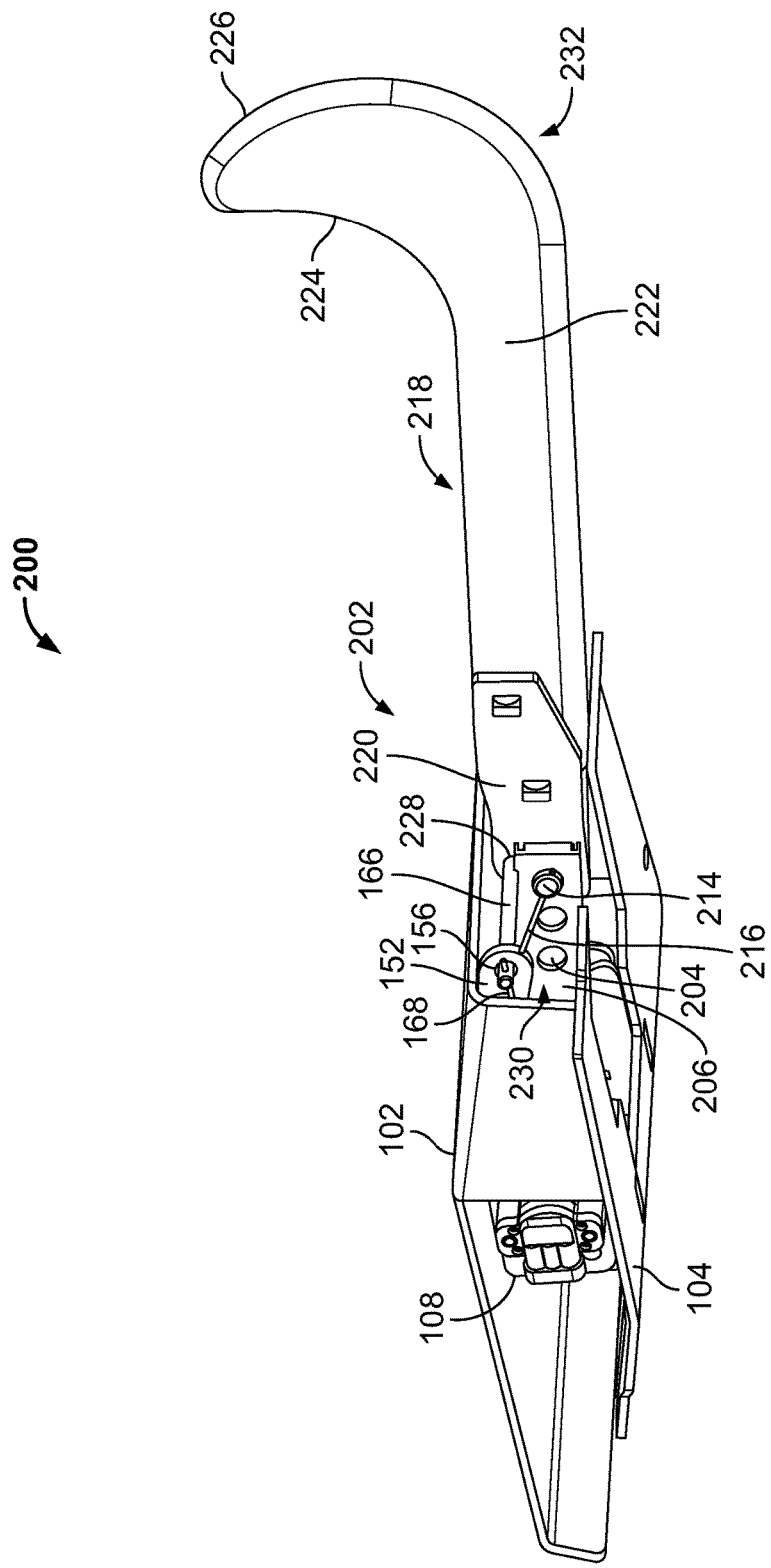
FIG. 13 is a side, perspective view of an exemplary ground height gauge assembly including a telescoping arm in a stowed position.

FIGS. 11-13 show perspective and detailed views of an exemplary ground height gauge assembly 200 (hereinafter "assembly 200") with components in an extended lengthened configuration, an extended shortened configuration, and a stowed position. Certain elements of the assembly 200 can be substantially similar in structure and/or function to the assembly 100. Therefore, like reference numbers represent like structures.

Rather than including two separate arms that can be coupled together, the assembly 200 includes a single, telescoping arm 202 rigidly coupled to the shaft 106 such that rotation of the telescoping arm 202 simultaneously rotates the shaft 106. As will be discussed below, the overall length of the telescoping arm 202 can be adjusted depending on the desired cut crop height. Similar to the first arm 110 of the assembly 100, changes in terrain impart forces on the telescoping arm 202 which causes the telescoping arm 202 and the shaft 106 to rotate, and the sensor 108 detects the rotational changes in the shaft 106 to transmit appropriate signals to the controller.

The telescoping arm 202 includes a first section 204 rigidly coupled to the shaft via a connection 122 and a second section 206 slidably mounted or coupled to the first section 204. In some embodiments, the first section 204 can define an elongated square, rectangular, round, or oval tube or block fabricated from a metal material. In some embodiments, the second section 206 can define an elongated rectangular, round or oval tube fabricated from a metal material and having an inner opening 208 dimensioned complementary to the outer surface of the first section 204. The second section 206 can therefore slide over the first section 204 and receives the first section 204 within the opening 208 to lengthen and shorten the overall length of the telescoping arm 202.

The first section 204 includes a first set of spaced apertures 210 extending therethrough, and the second section 206 includes a second set of spaced apertures 212 extending therethrough and disposed complementary to the first set of spaced apertures. Depending on the desired overall length of the telescoping arm 202, the second section 206 can be slid relative to the first section 204 until the apertures 210, 212 are aligned. An elongated pin 214 (e.g., an adjustment pin) can be passed through the apertures 210, 212 to couple the first and second sections 204, 206. In some embodiments, a secondary locking pin 216 can be used to prevent undesired removal of the elongated pin 214 from the apertures 210, 212.

The telescoping arm 202 includes a third section 218 fixedly coupled to the second section 206 via a flange 220. The third section 218 can be fabricated from a rubber material. The third section 218 can include an elongated portion 222 at a proximal end and connected via the flange 220 to the second section 206, and further includes a hook-like portion 224 with a rounded edge 226 configured to be in contact with the ground. The first section 204 defines a proximal end 230 of the telescoping arm 202, and the third section 218 defines a distal end 232 of the telescoping arm 202.

The flange 220 includes an opening 228 passing therethrough. The telescoping arm 202 can be rotated upwardly toward the frame 102 until the opening 228 of the flange 220 is aligned with the openings 156, 158 of the tabs 152, 154. An elongated pin 166 (with or without a secondary locking pin 168) can be passed through the openings 156, 158, 228 to mount the telescoping arm 202 in the stowed position. Thus, as shown in FIG. 11, in one configuration, the telescoping arm 202 can be positioned in an extended and lengthened configuration for higher crop cut heights. As shown in FIG. 12, in one configuration, the telescoping arm 202 can be positioned in an extended and shortened configuration for shorter crop cut heights. As shown in FIG. 13, in one configuration, the telescoping arm 202 can be positioned in a stowed position (e.g., for transport of the header). In some embodiments, the telescoping function of the telescoping arm 202 can be automated/powered with an actuation mechanism.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A ground height gauge assembly configured to be mounted to a header, the ground height gauge assembly comprising:
    a shaft configured to be rotatably coupled to the header;
    a first arm coupled to the shaft and configured to simultaneously rotate with the shaft, the first arm defining a first length; and
    a second arm pivotally coupled to the shaft and defining a second length, the second arm configured to be mounted in a first position and a second position;
    wherein the second length of the second arm is dimensioned greater than the first length of the first arm;
    wherein in the first position the second arm is configured to rotate independently of the first arm; and
    wherein in the second position the second arm is configured to be coupled to the first arm such that rotation of the first arm simultaneously rotates the second arm.

2. The ground height gauge assembly of claim 1, wherein the first arm is rigidly coupled to the shaft.

3. The ground height gauge assembly of claim 1, wherein a proximal end of the second arm comprises a fixation ring concentrically disposed around the shaft.

4. The ground height gauge assembly of claim 3, wherein in the first position, the fixation ring rotates freely around the shaft.

5. The ground height gauge assembly of claim 1, wherein a distal end of the first and second arms comprises a rounded edge configured to be disposed against the ground.

6. The ground height gauge assembly of claim 1, wherein the first arm comprises a flange with an opening passing therethrough, and the second arm comprises a flange with an opening passing therethrough.

7. The ground height gauge assembly of claim 6, comprising an elongated pin removably passing through the openings of the flanges of the first and second arms, the elongated pin coupling the first arm to the second arm.

8. The ground height gauge assembly of claim 7, wherein passing the elongated pin through the openings of the flanges of the first and second arms results in the second arm being mounted in the second position.

9. The ground height gauge assembly of claim 6, comprising a frame with a tab having an opening passing therethrough and an elongated pin removably passing through the opening of the flange in the second arm and the opening in the tab of the frame, resulting in the second arm being mounted in a stowed position.

10. The ground height gauge assembly of claim 1, comprising a sensor coupled to the shaft.

11. The ground height gauge assembly of claim 10, wherein the sensor is a potentiometer.

12. A ground height gauge assembly configured to be mounted to a header, the ground height gauge assembly comprising:
    a shaft configured to be rotatably coupled to the header; and
    a telescoping arm coupled to the shaft and configured to rotate with the shaft, the arm comprising a first section rigidly coupled to the shaft and a second section slidably mounted to the first section;
    a frame with a tab having an opening passing therethrough, the telescoping arm comprises a flange with an opening passing therethrough, and the ground height gauge assembly comprises an elongated pin removably passing through the opening of the tab and the opening of the flange, resulting in the telescoping arm being mounted in a stowed position
    wherein sliding the second section of the telescoping arm relative to the first section of the telescoping arm varies an overall length of the telescoping arm.

13. The ground height gauge assembly of claim 12, wherein a distal end of the telescoping arm comprises a rounded edge configured to be disposed against the ground.

14. The ground height gauge assembly of claim 12, comprising a potentiometer coupled to the shaft.

15. The ground height gauge assembly of claim 12, comprising a first set of apertures formed in the first section of the telescoping arm, and comprising a second set of apertures formed in the second section of the telescoping arm.

16. The ground height gauge assembly of claim 15, comprising an adjustment pin passing through aligned apertures of the first and second set of apertures, the adjustment pin coupling the first section of the telescoping arm to the second section of the telescoping arm.

17. A harvester header, comprising:
    a frame;
    a cutter bar mounted to the frame; and
    at least one ground height gauge assembly mounted to the frame, the at least one ground height gauge assembly comprising:
    (a) a shaft configured to be rotatably coupled to the header;
    a first arm coupled to the shaft and configured to rotate with the shaft, the first arm defining a first length; and
    a second arm pivotally coupled to the shaft and defining a second length, the second arm configured to be mounted in a first position and a second position;
    wherein the second length of the second 	arm is dimensioned greater than the first length of the first arm;
    wherein in the first position the second arm is configured to rotate independently of the first arm; and
    wherein in the second position the second arm is configured to be coupled to the first arm such that rotation of the first arm rotates the second arm.

18. The harvester header of claim 17, comprising a potentiometer coupled to the shaft.

19. A harvester, comprising:
    a header comprising:
    a frame;
    a cutter bar mounted to the frame; and
    at least one ground height gauge assembly mounted to the frame, the at least one ground height gauge assembly comprising:
    (a) a shaft configured to be rotatably coupled to the header;
    a first arm coupled to the shaft and configured to simultaneously rotate with the shaft, the first arm defining a first length; and
    a second arm pivotally coupled to the shaft and defining a second length, the second arm configured to be mounted in a first position and a second position;
    wherein the second length of the second arm is dimensioned greater than the first length of the first arm;
    wherein in the first position the second arm is configured to rotate independently of the first arm; and
    wherein in the second position the second arm is configured to be coupled to the first arm such that rotation of the first arm simultaneously rotates the second arm.

* * * * *